(12) United States Patent
Williams

(10) Patent No.: US 6,356,550 B1
(45) Date of Patent: *Mar. 12, 2002

(54) FLEXIBLE TIME DIVISION MULTIPLEXED BUS USING SONET FORMATTING

(75) Inventor: Kevin Wayne Williams, Glendale, AZ (US)

(73) Assignee: Mayan Networks Corporation, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/364,722

(22) Filed: Jul. 30, 1999

(51) Int. Cl.[7] .......................... H04L 12/50; H04Q 11/00; H04B 7/212
(52) U.S. Cl. ....................... 370/364; 370/369; 370/375; 370/423; 370/442; 370/538
(58) Field of Search ................................ 370/244, 376, 370/362, 463, 375, 466, 358, 392, 370, 364, 369, 442, 538, 423; 359/135; 340/825.8

(56) References Cited

U.S. PATENT DOCUMENTS

| | | | | |
|---|---|---|---|---|
| 4,914,429 A | * | 4/1990 | Upp | 340/825.8 |
| 4,967,405 A | * | 10/1990 | Upp et al. | 359/135 |
| 4,998,242 A | * | 3/1991 | Upp | 370/370 |
| 5,040,170 A | * | 8/1991 | Upp et al. | 359/135 |
| 5,185,736 A | * | 2/1993 | Tyrrell et al. | 370/358 |
| 5,289,507 A | | 2/1994 | Upp | 375/372 |
| 5,329,524 A | * | 7/1994 | Paker et al. | 370/370 |
| 5,784,369 A | * | 7/1998 | Romiti et al. | 370/358 |
| 5,784,377 A | * | 7/1998 | Batdar et al. | 370/463 |
| 5,878,039 A | * | 3/1999 | Gorshe et al. | 370/376 |
| 6,034,947 A | * | 3/2000 | Yoshida et al. | 370/244 |
| 6,049,550 A | * | 4/2000 | Baydar et al. | 370/466 |

FOREIGN PATENT DOCUMENTS

WO    PCT/US00/2009    10/2000

OTHER PUBLICATIONS

ITU G.709 Synchronous Multiplexing Structure 1991. Database [Online] 1–1. Available Web Site: www–library.itsi.d-isa.mil/org./ituccitt/g_709.html Accessed on: Jul. 2, 1999.

(List continued on next page.)

Primary Examiner—Hassan Kizou
Assistant Examiner—John Pezzlo
(74) Attorney, Agent, or Firm—Pennie & Edmonds LLP

(57) ABSTRACT

A SONET bus has a set of SONET mappers that transmit and receive facility signals on facility lines. Each facility line operates at a predetermined speed. Each SONET mapper generates a SONET signal by mapping the facility signals received by the SONET mapper into a predefined format for transmission. The predefined format includes timeslots associated with each received facility signal. Each SONET mapper receives a SONET signal and maps the received SONET signal into the facility signals transmitted by the SONET mapper on the facility lines. Each SONET signal includes an associated set of the facility signals. At least one counter outputs a timeslot count signal for synchronizing the timeslots of the facility signals. A set of bidirectional drivers has a mapper side and a system side. Each bidirectional driver receives the timeslot count signal. A first set of interconnections separately couples each bidirectional driver at the mapper side to at least one SONET mapper of the set of SONET mappers, such that each bidirectional driver receives the SONET signal generated by at least one SONET mapper and transmits the SONET signal received by at least one SONET mapper. A second set of interconnections couples the bidirectional drivers to each other at the system side. The bidirectional drivers transmit one or more of the facility signals via the second set of interconnections by extracting the one or more facility signals from the SONET signals generated by the SONET mappers in accordance with the timeslot count signal and the predefined format.

22 Claims, 14 Drawing Sheets

OTHER PUBLICATIONS

Mayan Networks Corporation. (1999). About Mayan Networks. Database [Online] 1–2. Availabel Web Site: www.mayannetworks.com/mn_about.html Accessed on: Jun. 3, 1999.

Mayan Networks Corporation. (1999). Why IP over Fiber? Database [Online] 1–2. Available Web Site: www.mayannetworks.com/mn_about.html Accessed on: Jun. 3, 1999.

Parente, Victor R. (Mar. 1998). Packet Over Sonet: Ringing Up Speed. Database [Online] 1–9. Available Web Site: www.data.com/tutorials/sonet.html Accessed on: Jun. 3, 1999.

SCSA Signal Computing System Architecture. FAQs about the ECTF H.100 Specification. Database [Online] 1–5. Available Web Site: www.scsa.org/products/h100qa.htm Accessed on: Jun. 8, 1999.

Series G Recommendations: G.700 to G.799. Database [Online] 1–3. Available Web Site: www.ituja.or.jp/book/itutg2.html Accessed on: Jul. 2, 1999.

Tektronix. (Apr. 1999). Synchronous Optical Network (SONET) Tutorial. Topic 1. Introduction to SONET. Database [Online] 1–3. Available Web Site: www.webproforum.com/tektronix/topic01.html Last modified: Apr. 29, 1999 Accessed on: Jun. 3, 1999.

Tektronix. (Apr. 1999). Synchronous Optical Network (SONET) Tutorial. Topic 2. Why Synchronize? Database [Online] 1–2. Available Web Site: www.webproforum.com/tektronix/topic02.html Last modified: Apr. 29, 1999 Accessed on: Jun. 3, 1999.

Tektronix. (Apr. 1999). Synchronous Optical Network (SONET) Tutorial. Topic 3. Frame Format Structure. Database [Online] 1–4. Available Web Site: www.webproforum.com/tektronix/topic03.html Last modified: Apr. 29, 1999 Accessed on: Jun. 3, 1999.

Tektronix. (Apr. 1999). Synchronous Optical Network (SONET) Tutorial. Topic 4. Overheads. Database [Online] 1–11. Available Web Site: www.webproforum.com/tektronix/topic04.html Last modified: Apr. 29, 1999 Accessed on: Jun. 3, 1999.

Tektronix. (Apr. 1999). Synchronous Optical Network (SONET) Tutorial. Topic 5. Pointers. Database [Online] 1–8. Available Web Site: www.webproforum.com/tektronix/topic05.html Last modified: Apr. 29, 1999 Accessed on: Jun. 3, 1999.

Tektronix. (Apr. 1999). Synchronous Optical Network (SONET) Tutorial. Topic 6. SONET Multiplexing. Database [Online] 1–2. Available Web Site: www.webproforum.com/tektronix/topic06.html Last modified: Apr. 29, 1999 Accessed on: Jun. 3, 1999.

Tektronix. (Apr. 1999). Synchronous Optical Network (SONET) Tutorial. Topic 7. SONET Network Elements. Database [Online] 1–5. Available Web Site: www.webproforum.com/tektronix/topic07.html Last modified: Apr. 29, 1999 Accessed on: Jun. 3, 1999.

Tektronix. (Apr. 1999). Synchronous Optical Network (SONET) Tutorial. Topic 8. SONET Network Configurations. Database [Online] 1–3. Available Web Site: www.webproforum.com/tektronix/topic08.html Last modified: Apr. 29, 1999 Accessed on: Jun. 3, 1999.

Tektronix. (Apr. 1999). Synchronous Optical Network (SONET) Tutorial. Topic 9. What are the Benefits of SONET? Database [Online] 1–4. Available Web Site: www.webproforum.com/tektronix/topic09.html Last modified: Apr. 29, 1999 Accessed on: Jun. 3, 1999.

Tektronix. (Apr. 1999). Synchronous Optical Network (SONET) Tutorial. Topic 10. SDH Reference. Database [Online] 1–3. Available Web Site: www.webproforum.com/tektronix/topic10.html Last modified: Apr. 29, 1999 Accessed on: Jun. 3, 1999.

Tektronix. (Apr. 1999). Synchronous Optical Network (SONET) Tutorial. Glossary. Database [Online] 1–11. Available Web Site: www.webproforum.com/tektronix/acronym.html Last modified: Apr. 29, 1999 Accessed on: Jun. 3, 1999.

TranSwitch Corporation. (Oct. 1997). L3M Device Level 3 Mapper Data Sheet. Document No.: TXC–03452B–MB, Ed. 3, pp. 1–40.

TranSwitch Corporation. (Dec. 1997). QT1M Device Quad T1 Mapper Data Sheet. Document No.: TXC–04251–MB, Ed. 3, pp. 1–96.

TranSwitch Corporation. (May 1998). DS1MX7 Device DS1 Mapper 7–Channel Data Sheet. Document No.: Preliminary TXC–04201B–MB, Ed. 1, pp. 1–146.

TranSwitch Corporation. (1999). DS1MX7: DS1 Mapper 7–Channel Device (TXC–04201B). Database [Online] 1–2. Available Web Site: www.transwitch.com/products/prod_ds1mx7_sum.shtml Accessed on: Jun. 14, 1999.

TranSwitch Corporation. (1999). QT1M: Quad T1 Mapper Device (TXC–04251). Database [Online] 1–2. Available Web Site: www.transwitch.com/products/prod_qt1m_sum.shtml Accessed on: Jul. 1, 1999.

* cited by examiner

FIG. 2A
PRIOR ART
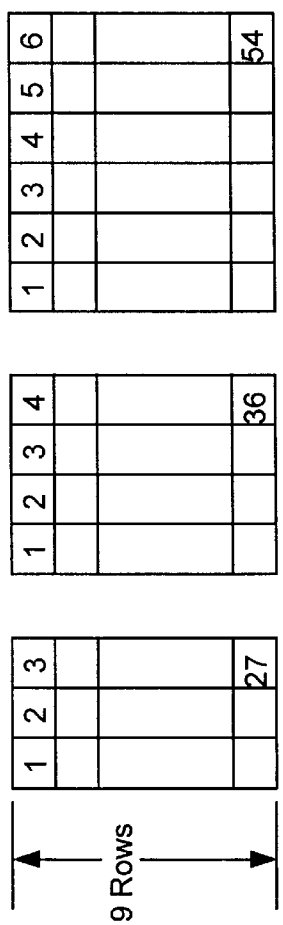
FIG. 2B VT 1 PRIOR ART
FIG. 2C VT 2 PRIOR ART
FIG. 2D VT 3 PRIOR ART
FIG. 2E VT 6 PRIOR ART

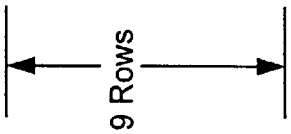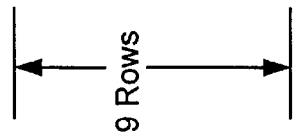
FIG. 2F  VT 1: A, B, C, D  PRIOR ART
FIG. 2G  VT 2: X, Y, Z  PRIOR ART
FIG. 2H  VT 3: M, N  PRIOR ART
FIG. 2I  VT 6: O  PRIOR ART

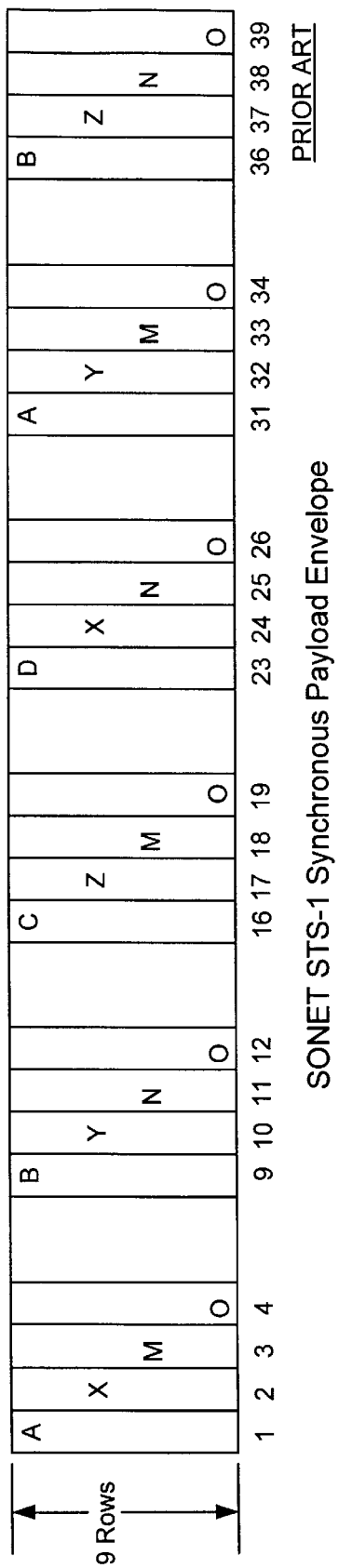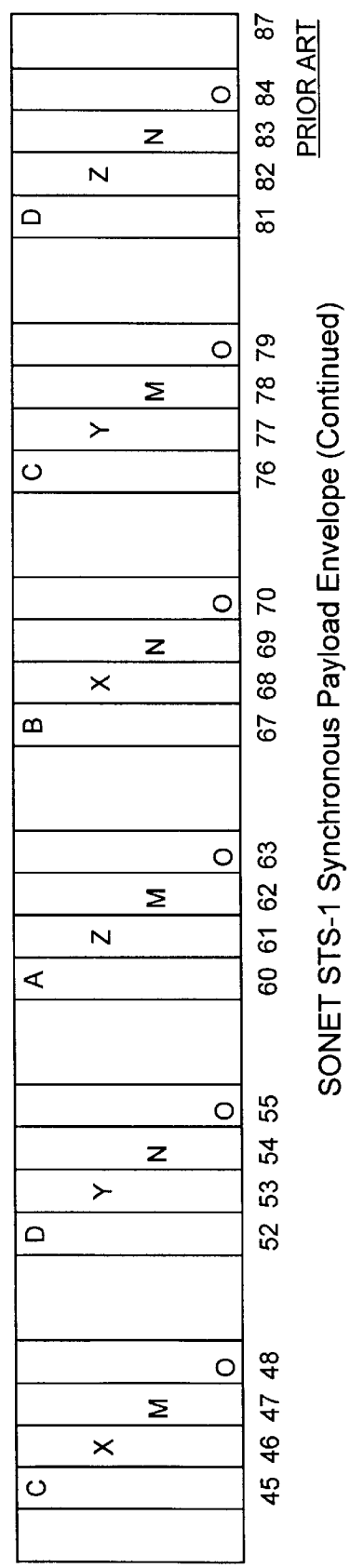

VT MULTIPLEXOR FOR TIMING GENERATOR FOR RING INTERCONNECTION

RING INTERCONNECTION

FLEXIBLE TIME DIVISION MULTIPLEXED BUS USING SONET FORMATTING

The present invention relates generally to a bus in a communication system, and more particularly to a time division multiplexed bus.

BACKGROUND OF THE INVENTION

Communications networks provide communications paths for voice and data using different protocols. In North America and other locations, a set of transmission signals referred to as the North American time division multiplexing hierarchy is used. This hierarchy includes DS1, DS2 and DS3 communications signals which are well-defined according to the following standards: ANSI T1.107, ANSI T1.403, Bellcore TR-TSY-000007, AT&T TR62411 and AT&T TR54016.

A DS1 signal has a transmission rate of 1.544 Mbps per second (Mbps). A DS2 signal includes four DS1 signals plus some overhead bits and has a transmission rate of 6.312 Mbps. A DS3 signal includes twenty-eight DS1 signals and has a transmission rate of 44.736 Mbps.

In other geographical areas, such as Europe, the time division multiplexing hierarchy described above is not used, but a European hierarchy with different transmission rates from that of the DS1, DS2 and DS3 is used. For example, an E1 signal with a rate of 2.048 Mbps that carries thirty channels is the lowest level of the multiplexing hierarchy, rather than a DS1 signal with a rate of 1.544 Mbps that carries twenty-four channels.

A standard called the synchronous optical network (SONET) protocol provides a common interface for transporting the different signaling hierarchies over an optical fiber. The SONET protocol can transport signals from both the North American and European hierarchies. The SONET standard defines a hierarchy of digital data rates, and is published in International Telecommunications Union (ITU) Recommendations G.707, G.708 and G.709. The SONET standards also include ANSI T1.105, ANSI T1.105.01, ANSI T1.105.02, ANSI T1.105.03, ANSI T1.105.03a, ANSI T1.105.03b, ANSI T1.105.04, ANSI T1.105.05, ANSI T1.105.06, ANSI T1.105.07, ANSI T1.105.07a and ANSI T1.105.09.

Each level of the SONET hierarchy is referred to as a synchronous transport signal (STS) level. The lowest level, STS-1, has a transmission rate of 51.84 Mbps. The STS-1 level can transport a single DS-3 signal or many lower rate signals, such as DS1 and DS2. Higher transmission rates are supported in the SONET hierarchy by combining multiple STS-1 signals into an STS-N signal. The SONET hierarchy ranges from the STS-1 level which has a transmission rate of 51.84 Mbps and a payload rate of 50.112 Mbps to an STS-48 level which has a transmission rate of 2,488.2 Mbps and a payload rate of 2,405.376 Mbps.

In FIG. 1, in a prior art system, a communications path is provided between an optical fiber 20 and facility lines 22 using a SONET transceiver 24 and SONET mappers 26. The SONET transceiver 24 provides the optical to electrical interface between the fiber 20 and the SONET mappers 26. In the SONET transceiver 24, a SONET transmitter 32 is electrically connected to an add bus 34 from the SONET mappers 26 and a SONET receiver 35 is electrically connected to a drop bus 38 of the SONET mappers 26.

The SONET mappers 26 transmit and receive facility signals on the facility lines 22. In one embodiment, the facility signals are electrical signals having a predetermined transmission rate. To transmit facility signals, the SONET mappers 26 map the facility signals to a SONET signal having a predefined format. The predefined format includes timeslots that are associated with each facility signal. The SONET mappers 26 also receive a SONET signal and map the SONET signal to the facility signals, using the predefined format, for transmission over the facility lines 22.

The add bus 34 and the drop bus 38 from each SONET mapper 26 are well-known Telecom bus interfaces. Mapping is performed according to ANSI standard T1.105 and Bellcore standard GR-253-CORE for T1.5 and International Telecommunications Union (ITU) G.709 for a synchronous mapping structure. Both the add bus 34 and the drop bus 38 of the SONET mappers 26 have an eight bit wide data path and use additional timing signals. Alternately, the add bus 34 and the drop bus 38 of the SONET mappers 26 have an nine bit wide data path that includes a parity bit and use additional timing signals.

As shown in FIG. 2A, the basic SONET building block is an STS-1 frame 40 which has a header 42 and a SONET payload envelope (SPE) 44. The frame 40 has 810 bytes (octets) and, is transmitted once every 125 μsec. The frame 40 is typically viewed as a matrix having nine rows and ninety columns. Transmission is one row at a time from left to right and top to bottom. The header 42 includes overhead octets, and the SPE 44 carries data. The SPE 44 has eighty-seven columns of which forty-eight carry data and the remainder are overhead.

The SONET specification defines synchronous formats for the SPE for transmission rates below the STS-1 level. The STS-1 SPE 44 is subdivided into virtual tributaries in which each virtual tributary (VT) is associated with a signal having a predefined transmission rate. FIGS. 2B, 2C, 2D and 2E show each type of VT and the number of rows and columns associated with that VT. As shown in FIG. 2B, to transport DS1 signal, VT 1 uses nine rows and three columns of the SPE. Table 1 below summarizes the virtual tributaries, their bit rate and size.

TABLE 1

Summary of Virtual Tributary

| VT Type | Bit Rate | Size of VT |
| --- | --- | --- |
| VT 1 | 1.728 Mbps | 9 rows, 3 columns |
| VT 2 | 2.304 Mbps | 9 rows, 4 columns |
| VT 3 | 3.456 Mbps | 9 rows, 6 columns |
| VT 6 | 6.912 Mbps | 9 rows, 12 columns |

A VT 1 has sufficient bandwidth to transmit a DS1 signal, while a VT 6 has sufficient bandwidth to transmit a DS2 signal. A VT 3 is not the same as a DS3 and has a much lower bit rate than the DS3. To transmit a DS3 signal, the entire STS-1 SPE is dedicated to the one DS3.

FIG. 2F shows four VT 1's, labeled A, B, C and D. Each VT 1 has the capacity to transmit a DS1 signal. The VT 1's are interleaved among themselves for transmission. FIG. 2G shows three VT 2's, labeled X, Y and Z. The VT 2's are interleaved among themselves for transmission. FIG. 2H shows two VT 3's, labeled M and N. The VT 3's are interleaved among themselves for transmission. FIG. 2I shows a VT 6, labeled O.

In FIGS. 2J and 2K, an exemplary format for an SPE 44 that transmits the four VT 1's, the three VT 2's, the two VT 3's and the one VT 6 is shown. A complex interleaving pattern associates each VT with particular columns or timeslots. The VT label associated with a timeslot is indicated in each column and the timeslot number of the SPE 44 is shown below each column. Some of the columns that do not have an associated label contain pointer values and are used to compensate for timing variations. The interleaving patterns are defined in the ANSI T1.105 specification.

Many communication systems, such as switches and private branch exchanges, use time-division multiplexed buses. In computer telephony integration, commonly used internal system buses include the Multi-Vendor Interface Protocol (MVIP) and H.100A buses. The MVIP and H.100A buses are targeted towards connections that use integral multiples of sixty-four kilobits per second (Kbps). MVIP and H.100A also impose a maximum transmission speed of 16 Mbps. Typical transmission speeds encountered in communications networks are 1.544 Mbps (DS1), 44.736 Mbps (DS3) and 51.84 Mbps (SONET STS-1). Of the three aforementioned rates, DS3 and STS-1 exceed the maximum transmission speed of MVIP and H.100A by a factor of over two, and only 51.84 Mbps is a multiple of sixty-four Kbps.

Therefore, a time-division multiplexed bus for use internally in a communications system that supports transmission rates that are not integral rates of 64 Kbps is needed. The bus should also be capable of handling transmission speeds exceeding 16 Mbps, including 44.736 Mbps and 51.84 Mbps.

Another disadvantage of the MVIP and H.100 buses is that the MVIP and H.100 buses have an absolute clocking constraint which, under certain conditions, corrupts the data in the signal being transported. If the facility signal that is being transported across the MVIP or H.100 bus is based on timing which is slightly slower than that of the MVIP or H.100 bus, the circuitry responsible for transporting the facility signal is required to repeat data periodically to compensate for the difference. Conversely, if the facility signal being connected across the MVIP or H.100 bus is based on timing which is slightly faster than the MVIP or H.100 bus timing, the circuitry responsible for transporting the facility signal is required to delete data periodically to compensate for the difference. Both of these actions corrupt the facility signal being transported. Facility signals frequently have slight timing inaccuracies, and thus cannot be accurately transported across an H.100 or MVIP bus.

Therefore, there is a need for a time-division multiplexed bus for use internally in a communications system that does not corrupt the data in the transported facility signal when the timing of that facility signal deviates from the timing of the time-division multiplexed bus.

SUMMARY OF THE INVENTION

A SONET bus provides high speed interconnections using SONET mappers and a bidirectional drivers. A SONET bus has a set of SONET mappers that transmit and receive facility signals on facility lines. Each facility line operates at a predetermined speed. Each SONET mapper generates a SONET signal by mapping the facility signals received by the SONET mapper into a predefined format for transmission. The predefined format includes timeslots associated with each received facility signal. Each SONET mapper receives a SONET signal and maps the received SONET signal into the facility signals transmitted by the SONET mapper on the facility lines. Each SONET signal includes an associated set of the facility signals. At least one counter outputs a timeslot count signal for synchronizing the timeslots of the facility signals. A set of bidirectional drivers has a mapper side and a system side. Each bidirectional driver receives the timeslot count signal. A first set of interconnections separately couples each bidirectional driver at the mapper side to at least one SONET mapper of the set of SONET mappers, such that each bidirectional driver receives the SONET signal generated by at least one SONET mapper and transmits the SONET signal received by at least one SONET mapper. A second set of interconnections couples the bidirectional drivers to each other at the system side. The bidirectional drivers transmit one or more of the facility signals via the second set of interconnections by extracting the one or more facility signals from the SONET signals generated by the SONET mappers in accordance with the timeslot count signal and the predefined format.

In another aspect of the invention, multiple parallel SONET buses provide a high speed interconnection.

In yet another aspect of the invention, a SONET ring interconnects sets of multiple parallel SONET buses.

In an alternate aspect of the invention, a communications system uses the SONET bus of the present invention.

The SONET bus provides a flexible high speed interface among various components. In addition, the SONET bus is not limited to transmission speeds of multiples of sixty-four Kbps, and allows transmission of signals with rates exceeding sixteen Mbps. The SONET bus also compensates for timing variations of the facility signals with respect to a SONET signal without corrupting the data of the facility signal.

BRIEF DESCRIPTION OF THE DRAWINGS

Additional objects and features of the invention will be more readily apparent from the following detailed description and appended claims when taken in conjunction with the drawings, in which:

FIG. 2A is a diagram illustrating a SONET frame of the prior art.

FIG. 2B is a diagram illustrating a row and column arrangement for a first type of virtual tributary, VT 1, that carries a DS1 signal of the prior art.

FIG. 2C is a diagram illustrating a row and column arrangement for a second type of virtual tributary, VT 2 of the prior art.

FIG. 2D is a diagram illustrating a row and column arrangement for a third type of virtual tributary, VT 3, of the prior art.

FIG. 2E is a diagram illustrating a row and column arrangement for a fourth type of virtual tributary, VT 6, of the prior art.

FIG. 2F is a diagram illustrating a row and column arrangement for interleaving four VT 1 signals of the prior art.

FIG. 2G is a diagram illustrating a row and column arrangement for interleaving three VT 2 signals of the prior art.

FIG. 2H is a diagram illustrating a row and column arrangement for interleaving two VT 3 signals of the prior art.

FIG. 2I is a diagram illustrating a row and column arrangement of a VT 6 signal of the prior art.

FIGS. 2J and 2K are diagrams illustrating the complex interleaving format of an exemplary prior art SONET payload envelope of FIG. 2A using the VT 1, 2, 3 and 6 signals of FIGS. 2F, 2G, 2H and 2I, respectively.

DESCRIPTION OF THE PREFERRED EMBODIMENTS

Figure 1:
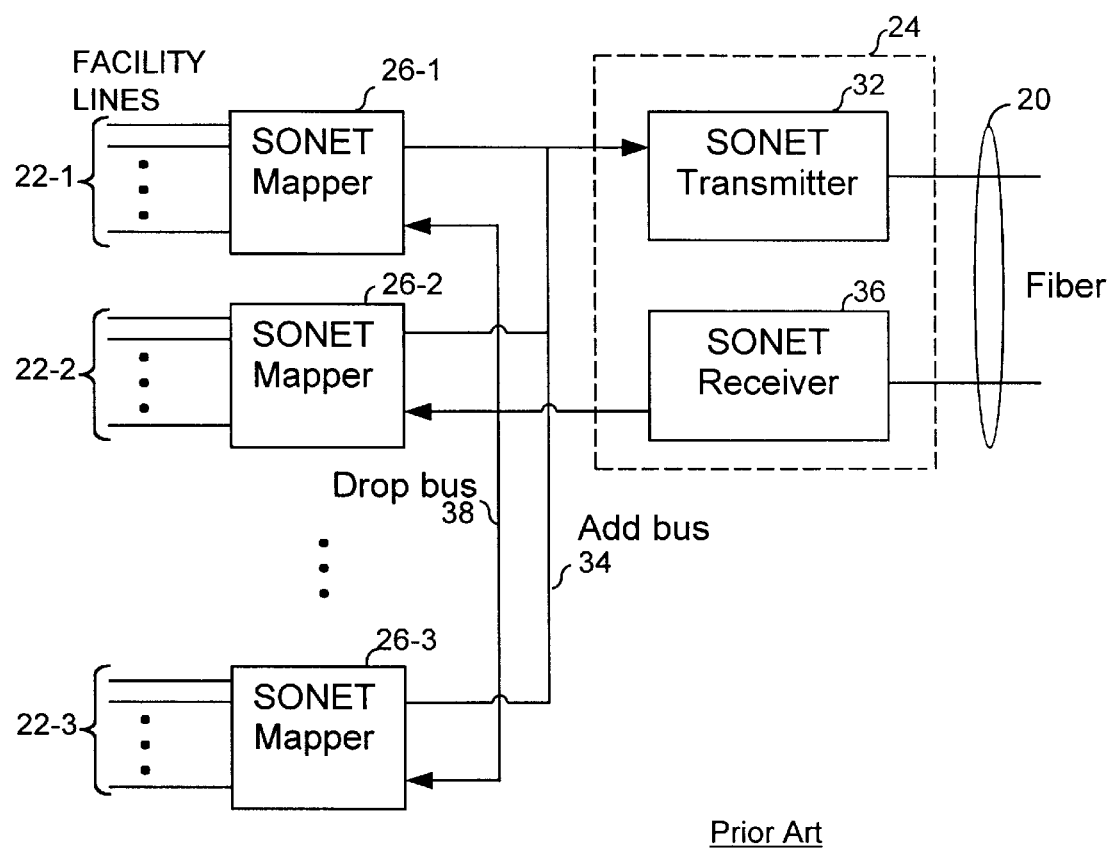
FIG. 1 is a diagram of a prior art architecture using SONET mappers to connect facility lines to an optical fiber in a transmission system.
Figure 3:
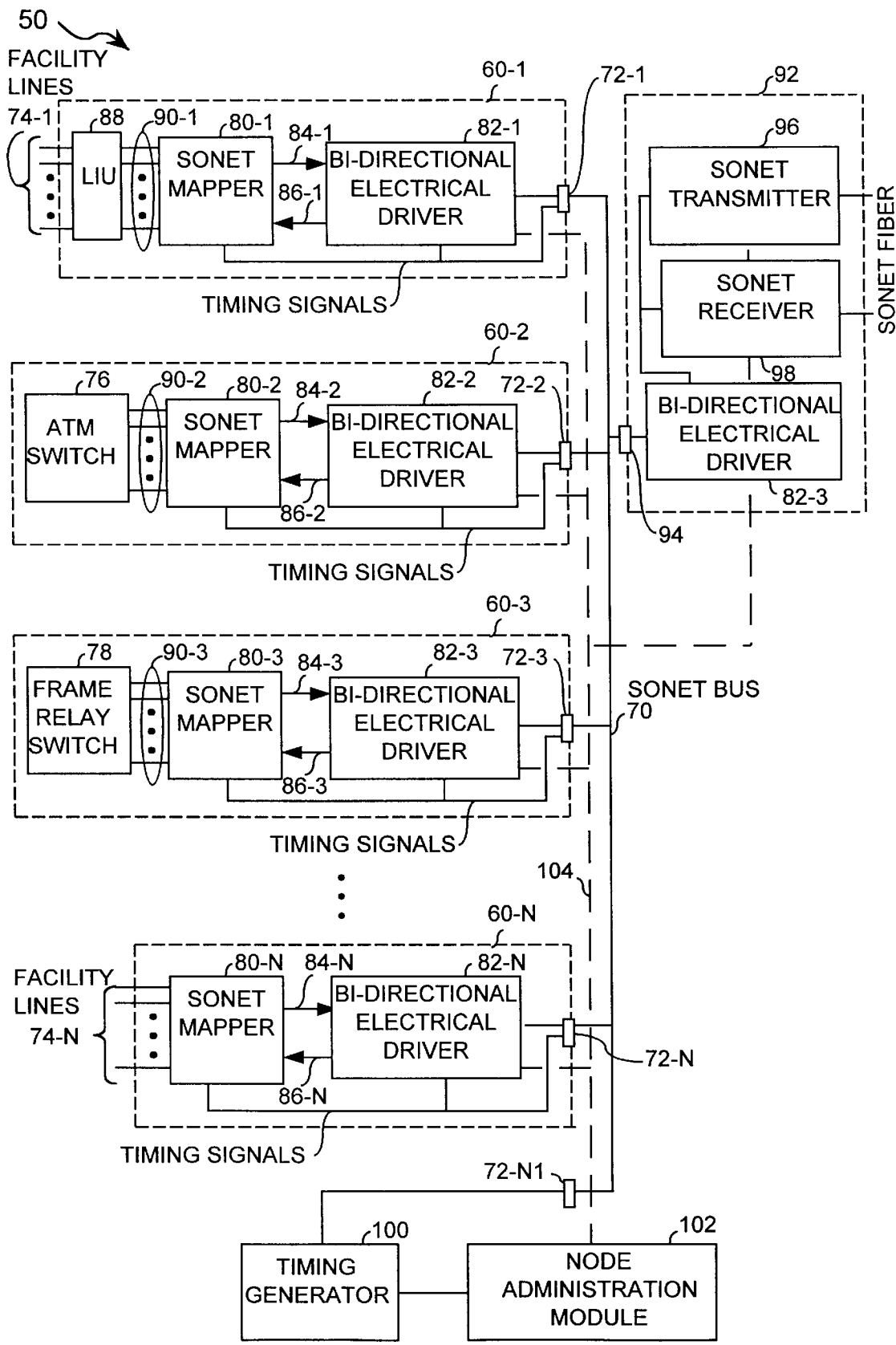
FIG. 3 is a block diagram of an exemplary communication system using a SONET bus architecture in accordance with an embodiment of the present invention.

In FIG. 3, a communications system 50 interconnects communications signals that use different protocols using a set of payload interface modules 60 that communicate via a SONET bus 70 according to an embodiment of the present invention. The SONET bus 70 is implemented on a backplane of the communications system. Each payload interface module 60 is implemented on a separate card that plugs into a connector 72 attached to the SONET bus 70 on the backplane. One payload interface module 60-1 connects to facility lines 74-1 used as external connections that transport DS1 signals. A second payload interface module 60-2 includes an internal asynchronous transfer mode (ATM) switch 76 that uses ATM protocol. A third payload interface module 60-3 includes an internal frame-relay switch 78 that uses frame-relay protocol. An N$^{th}$ payload interface module 60-N connects to additional facility lines 74-N used as external connections. The SONET bus 70 provides a flexible common high speed interface that allows the various types of payload interface modules 60 to support different protocols. In this way, as new protocols are developed, the SONET bus 70 allows the communication system 50 to support the new protocol by adding a new interface card that plugs into the SONET bus 70.

In each payload interface module 60, at least one SONET mapper 80 is electrically connected to a bidirectional electrical driver 82 that controls the flow of data through the SONET bus 70. An add bus 84, a drop bus 86 and the SONET bus 70 transport a SONET signal at a predefined STS level, such as STS-3. In other alternate embodiments, other STS levels can be used including STS-1, STS-12 and STS48.

In the payload interface module 60-1, a line interface unit (LIU) 88 receives the facility signals from the facility lines 74-1 and passes the facility signals as unipolar digital signals to the SONET mapper 80-1. The LIU 88 also receives unipolar digital signals 90-1 from the SONET mapper 80-1. The unipolar digital signal 90-1 is a digital representation of a long haul transmission line interface for the facility signals. The unipolar digital signal is compatible with CMOS, TTL or equivalent digital technology for use in a circuit board or across a backplane. The LIU 88 converts the unipolar digital signals to a long-haul transmission line interface. The LIU 88 typically has several components including a complex integrated circuit, discrete resistors, discrete capacitors and transformers. The long-haul transmission line interface is designed to span long distances ranging from a few hundred feet to several kilometers. The long-haul transmission line interfaces 90 are specified in ANSI T1.103 for DS1, DS2 and DS3 signals, and in ITU G.912 for E1 and ITU G.916 for E3 signals.

In an alternate embodiment, a separate LIU is not used and the SONET mapper 80-N connects directly to the facility lines 74-N. For simplicity, the following description will not show the LIU; however, the facility signals 74 can connect to the SONET mappers 80 using the LIU 88.

Typically, the SONET mapper 80-1 formats the unipolar digital signals that correspond to the facility signals into a SONET signal having a SONET payload envelope with a predefined SONET format, and supplies the SONET signal to the bidirectional driver 82-1 via the add bus 84-1. In alternate embodiments, the facility signals include DS1, DS2 and DS3 signals. The bidirectional electrical driver 82-1 also receives a SONET signal, or portion thereof, and transmits that signal to the SONET mapper 80-1 via the drop bus 86-1. The SONET mapper 80-1 maps the received SONET signal into at least one facility signal and outputs the facility signal on the appropriate facility line. The other SONET mappers 80-2, 80-3 and 80-N receive unipolar digital signals having other formats and map those facility signals into a SONET payload envelope.

Using the bidirectional electrical drivers 82 with the SONET mappers 80, communications paths are formed locally within and among the payload interface modules 60. In one implementation, at least some of the facility signals on the facility lines 74-1 are connected to facility signals on facility lines 74-N connecting to one of the other mappers 80-N. Any facility signal on one of the facility lines 74-1 can also be connected to another facility line connected to the same mapper 80-1. Furthermore, the facility signals can be transmitted to facility lines on other mappers that interface with circuits that perform additional signal processing.

Different types of SONET mappers 80 are used to map different types of facility signals. A preferred embodiment of the present invention uses SONET mappers 80 that are manufactured by TranSwitch Corporation including: a TXC-03452B™ Level 3 mapper that maps a DS3 or E3 signal to a SONET signal, and a TXC-04201 B™ mapper that maps seven DS1 signals into a SONET signal. TXC is a registered trademark of the TranSwitch Corporation.

These SONET mappers are programmable and can generate an STS-1 or an STS-3 signal. When DS1 signals are supplied, each DS1 is associated with a virtual tributary and the mapper is programmed to associate the virtual tributary with a predefined timeslot in the SONET signal, as shown in FIGS. 2J and 2K.

Preferably, many types of mappers are used such that the communications system transports facility signals including: DS1, DS2 and DS3 signals, a 2.048 Mbps E1 signal of the ITU G.703 interface, and a 34.368 Mbps E3 signal, in addition to the 51.84 Mbps SONET STS-1 level signal.

To connect to an optical fiber, an optical transceiver 92 is connected to the SONET bus 70 using connector 94. In one embodiment, the optical transceiver 92 includes the bidirectional electrical driver 82-4 to provide an interface between the SONET bus 70 and the SONET transmitter 96 and receiver 98. In an alternate embodiment, the optical transceiver 92 connects directly to the SONET bus without the bidirectional electrical driver.

In this embodiment, the SONET bus 70 has an eight-bit wide datapath with timing signals which will be discussed below. At least one timing generator 100 supplies the timing signals to synchronize the timing of the SONET bus 70 and will also be explained in further detail below. In an alternate embodiment, the SONET bus 70 has a nine-bit wide datapath including eight data bits and one parity bit.

A node administration module (NAM) 102 controls the communications system 50 using control signals on a control bus 104 (dashed lines) such as the well-known peripheral component (PCI) bus. The node administration module 102 supplies control signals to the timing generator 100, the SONET mappers 80, and the bidirectional electrical drivers 82. If a backup timing generator is used, the NAM 102 manages the switching to the backup timing generator when the primary timing generator fails.

In the communications system 50, a SONET mapper 80-2 connects to the ATM switch 76 using unipolar digital signals 90-2. The unipolar digital signals 90-2 are digital representations of DS1, DS3 or STS-N signals that carry the ATM signals.

In another payload interface module 60-3, another SONET mapper 80-3 connects to a frame relay switch 78 using the unipolar digital signals 90-3. The unipolar digital signals 90-3 are digital representations of DS1, DS3 or STS-N signals that carry the frame relay signals.

Using the SONET bus 70, telecommunications signals from different types of facility lines 74 with different formats, the ATM switch 76 and the frame relay switch 78 are interconnected. In this configuration, any of the external facility lines 74-1 can be operated as frame relay by programming the respective SONET mappers 80-1 and 80-3 and bidirectional electrical drivers 82-1 and 82-3 to exchange data in appropriate timeslots. In addition, any of the external facility lines 74-1 can be operated in ATM mode by programming the SONET mappers 80-1 and 80-2 and the bidirectional electrical drivers 82-1 and 82-2 to exchange data during appropriate timeslots of the SONET signal. An external facility signal can be changed from frame relay to ATM, or from ATM to frame relay, by reprogramming the SONET mappers 80 and bidirectional electrical drivers 82 to exchange data during appropriate timeslots of the SONET signal. The SONET signals can also be used to exchange data between the frame relay switch 78 and the ATM switch 76. To connect to a new type of telecommunications interface, only an additional payload interface module 60 need be designed.

The SONET standards include a technique, commonly referred to as "pointer adjustment," which allows for accurately reconstructing facility signals whose timing deviates from the timing of the SONET signals by up to 1%. Using this technique across the SONET bus allows the communications system to transport inaccurately timed facility signals. The pointer adjustment technique does cause a phenomenon known as clock jitter, in which signals which had a substantially invariant frequency will now vary in frequency. The amplitude and frequency of the frequency variation increases in proportion to the inaccuracy of the facility signal; however, the average frequency is equal to the original input frequency of the facility signal. Therefore, the method of clock synchronization described below is used to prevent excessive skew between the time base of the system bus and the time base of the transmitted facility signals.

Figure 4:
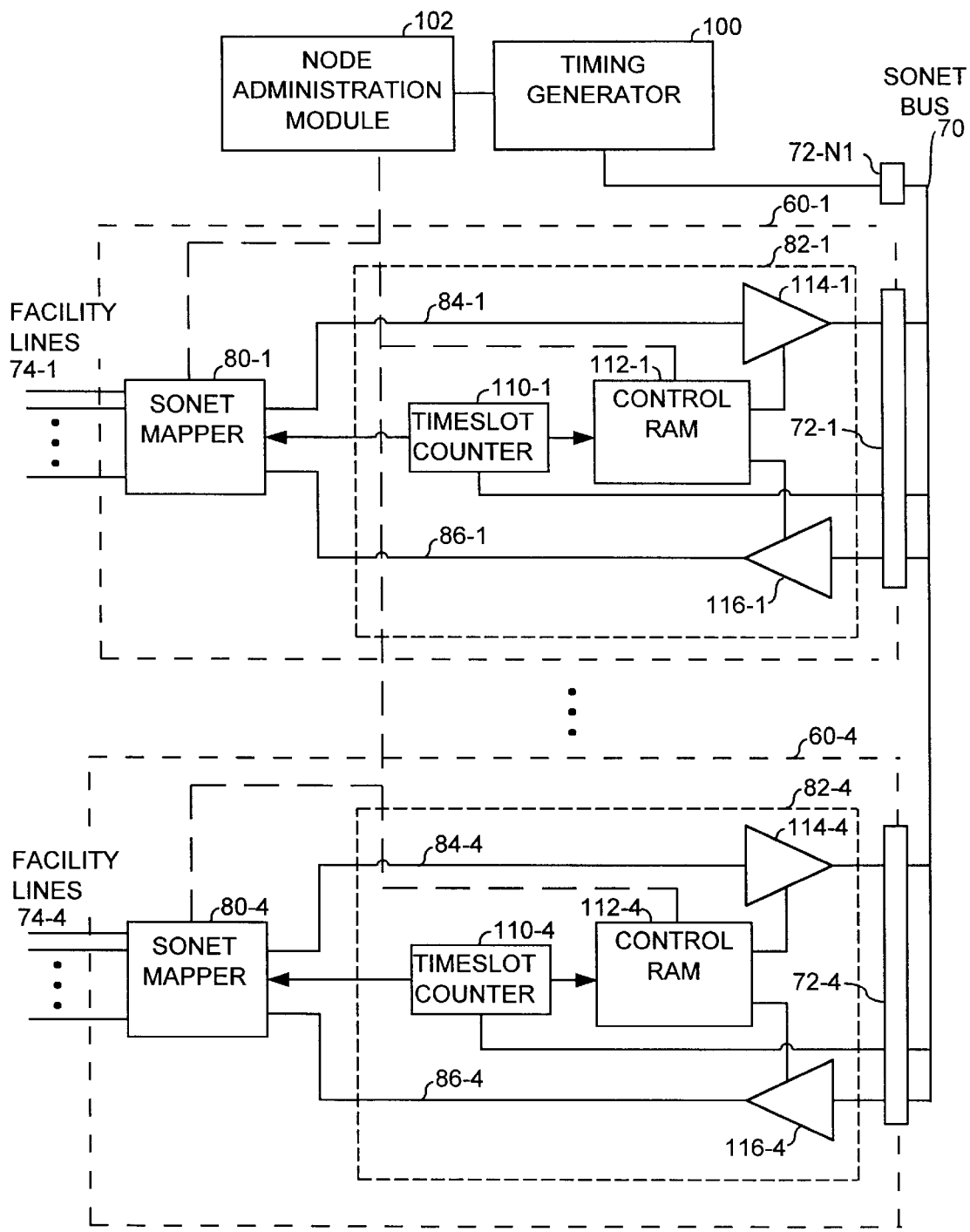
FIG. 4 is a detailed block diagram of a payload interface module of the SONET bus architecture of FIG. 3.

In FIG. 4, the timing generator 100 supplies the timing signals to synchronize the timing of the SONET bus 70. The timing signals are part of the SONET bus 70 and the payload interface modules 60 receive the timing signals from the SONET bus connectors 72. The timing signals are supplied to each SONET mapper 80 and each bidirectional electrical driver 82. The timing signals include a SONET clock that synchronizes and sets the STS level or data rate of the SONET bus 70. In one embodiment, the SONET clock, and therefore the SONET bus 70, the add buses 84 and the drop buses 86, operate at an STS-1 level with a SONET clock rate of 6.48 Megahertz (MHz). In another preferred embodiment, the SONET clock, and therefore the SONET bus 70, the add buses 84 and the drop buses 86 operate at an STS-3 level with a SONET clock rate of 19.44 MHz. The SONET clock rate determines the period of each timeslot. Alternate embodiments include the use of SONET rates other than STS-1 or STS-3, such as STS-12. Another alternate embodiment uses different SONET clock rates for the SONET bus and the add and drop busses. For example, the SONET bus could operate at STS-3 while the add and drop buses operate at STS-1.

In addition to the SONET clock, the timing generator 100 generates a frame clock and a super-frame clock. For instance, for a SONET bus 70 operating at the STS-3 level, the timing generator 100 generates the 19.44 MHz SONET clock, an 8 KHz frame clock and a 2 KHz super-frame clock. In the preferred embodiment, the SONET bus clock and the clocking for any DS1s being connected through the system are frequency locked. In other words, an 8 KHz signal derived from the SONET bus and an 8 KHz signal derived from the DS1 s would be identical. To frequency-lock the SONET bus clock and the DS1s, a DS1 signal is divided by 193 and multiplied by 2,430 to generate the 19.44 MHz SONET clock. The 19.44 MHz SONET clock is then divided by 2,430 to regenerate the 8 KHz clock, and also divided by 9,720 to generate the 2 KHz clock. The set of DS1s available for use as the master timing source is selected by the system administrator, while the individual DS1 used at any given time as the timing source is selected by the system based on signal quality. Each stage of the clock generation and division logic incorporates phase-locked loops (PLLs) to survive transient interruptions of the signals.

To synchronize the operation of the bidirectional drivers 82 among themselves and the SONET mappers 80, a timeslot counter 110 in each bidirectional driver 82 is reset by the 8 KHz frame clock. After being reset, the timeslot counter 110 is incremented by the 19.44 MHz clock to generate a timeslot signal that identifies the timeslots. The timeslot signal is supplied to a control RAM 112 as an address. In a preferred embodiment the control RAM 112 is a 2K×4 dual port memory. The control RAM 112 outputs a set of data signals that are used to enable or disable first and second bus drivers 114, 116, respectively, during each timeslot.

The control RAM 112 is connected to the SONET mapper 80 and to the first and the second bus driver 114, 116, respectively. The NAM 102 downloads a control program to the control RAM 112. The control program includes a pattern associating the appearance of the facility signals with the timeslots in the SONET signal. The pattern of the control programs defines the flow of data through the communication system. DS3 level signals are interconnected. Alternately, virtual tributaries, or portions thereof, are interconnected. A system administrator configures the communication system and defines the mapping among facility lines that is embodied in the control program. In this way, the bidirectional electrical drivers 82 are synchronized to the timeslot signal and specified portions of the SONET signals on the SONET bus are mapped among various facility lines.

The NAM 102 also downloads mapping configurations into the SONET mappers 80 in the payload interface modules 60 so as to control the mapping operations performed by the SONET mappers 80.

Figure 5:
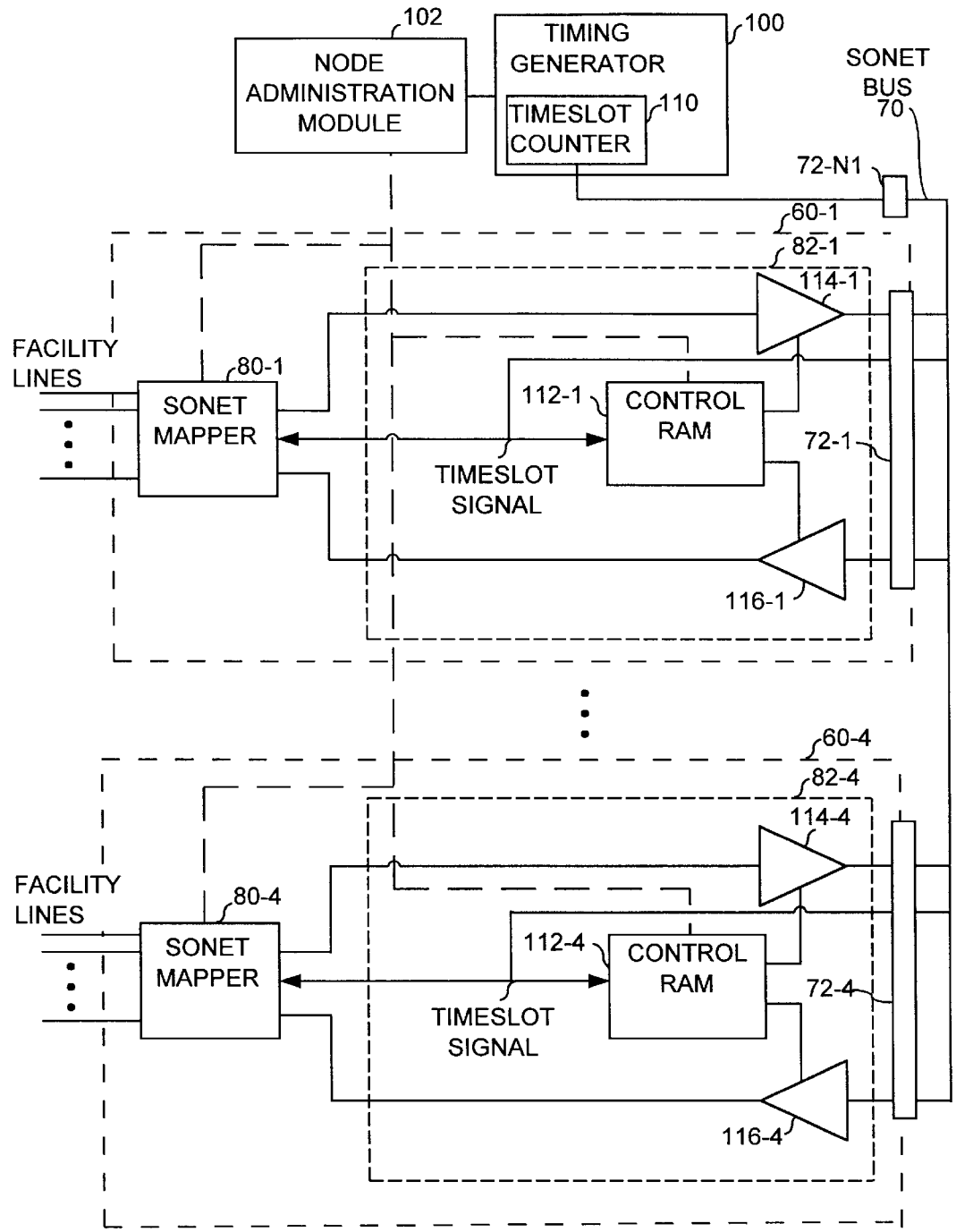
FIG. 5 is an alternate embodiment of the payload interface module of the SONET bus architecture of FIG. 3.

In FIG. 5, in an alternate embodiment, the timing generator 100 includes a timeslot counter 110 that supplies the timeslot signal to the SONET mappers 80 and the bidirectional electrical drivers 82 via the SONET bus 70.

Figure 6:
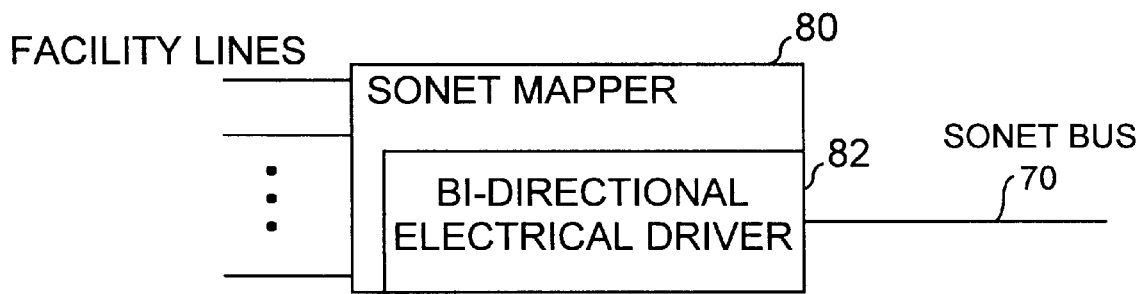
FIG. 6 is an embodiment of a SONET mapper incorporating a bidirectional electrical driver according to an embodiment of the present invention.

In FIG. 6, in another alternate embodiment, a SONET mapper 80 includes the bidirectional electrical drivers 82 of the present invention.

Multiple Parallel Time Division Multiplexed Buses

In the embodiment described above, the clock rate of the one-byte wide SONET bus increases incrementally with the number of payload interface modules, and, in theory, could operate at any STS-N rate such as STS-2, STS-3 or STS4. Because SONET transmission systems have standardized on a few clock rates, this incremental growth becomes a step-wise function, with the standardized clock rate being derived from transmission speeds of STS-3 (155.52 Mbps), STS-12 (622 Mbps), STS48 (2.4 Gbps) and STS-192 (9.6 Gbps). At 622 Mbps, the clock speed of a one byte-wide bus exceeds seventy-six MHz, which is expensive to implement with current electronics. At 2.4 Gbps, the clock rate of a one byte-wide bus exceeds 300 MHz.

Figure 7:
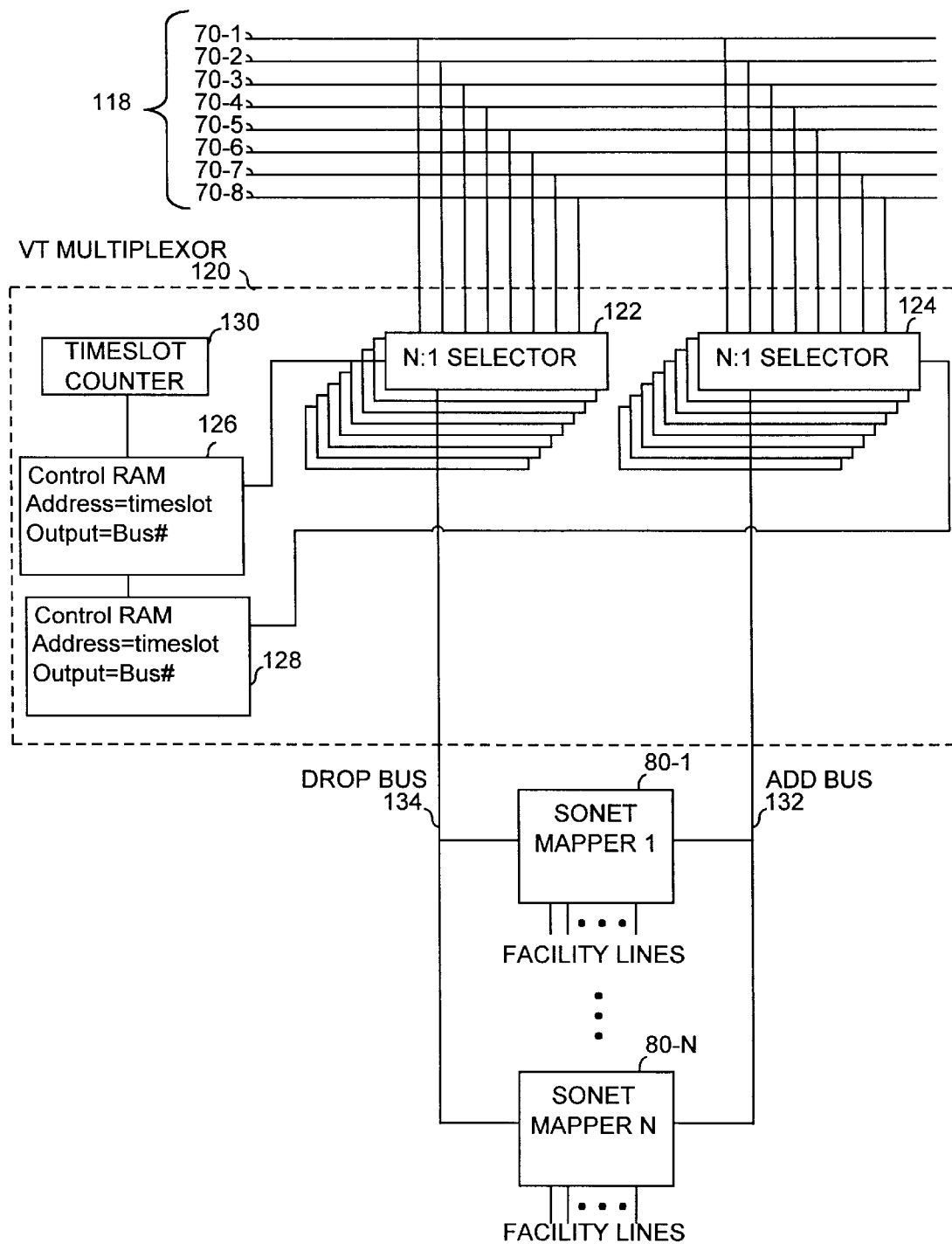
FIG. 7 is a block diagram of a multiple parallel SONET bus architecture in accordance with another embodiment of the present invention.

In FIG. 7, to increase bandwidth, a set 118 of SONET buses 70 is operated concurrently, in parallel using a virtual tributary (VT) multiplexor 120. The VT multiplexor 120 is, in essence, a high performance version of the bi-directional electrical drivers 82 used in the single SONET bus system 50 shown in FIG. 3.

Each SONET bus 70 connects to an input port of a selector 122 and an output port of another selector 124 of the VT multiplexor 120. Receive selector 122 is a multiplexor, while transmit selector 124 is a demultiplexor. The receive N:1 selector 122 receives SONET bus signals from the SONET buses 70, and the transmit N:1 selector 124 transmits a SONET bus signal onto a selected one of the SONET buses 70. Each SONET bus 70 has a eight bit wide datapath and the set 118 has one set of timing signals, described above, that synchronizes the operation of all the SONET buses 70.

Each selector 122, 124 is associated with a control RAM 126, 128, respectively. Each control RAM 126, 128 receives the timeslot signal from a timeslot counter 130 as an address. The timeslot counter 130 operates as described above, and synchronizes the timing for all datapaths in the multiple parallel SONET bus 70 architecture. The NAM downloads a multiplexing pattern into the control RAMs 126, 128, as described above. The multiplexing pattern enables and disables the selectors 122, 124 to connect the add and drop buses, 132, 134, respectively, to a desired SONET bus 70.

In one embodiment, eight drop selectors 122 and eight add selectors 124 connect to eight SONET buses 70. The multiplexing pattern in the control RAMs 126, 128 control the operation of all the receive and transmit selectors, 122, 124, respectively. Each pair of selectors 122, 124 is connected to a set of SONET Mappers 80. In FIG. 7, for simplicity, only one set of SONET mappers 80 is shown. Each SONET bus 70 has a one-byte wide datapath.

During operation, many SONET bus signals are simultaneously transmitted over the SONET buses. For example, in the aforementioned embodiment, eight SONET buses 70 are simultaneously transmitting data in parallel synchronized to the same SONET bus timing signals. In response to the enabling signals from the control RAMs 126, 128, the receive and transmit selectors (also sometimes called add and drop selectors) 122, 124, respectfully, connect various ones of the SONET buses 70 to one or more sets of SONET mappers 80. In response to the mapping configurations downloaded into the SONET mappers 80, the SONET mappers 80 connect all or a desired portion of the SONET signal to at least one facility line.

To transmit a signal from a facility line, in response to the mapping configurations downloaded into the SONET mappers 80, the SONET mappers 80 map a facility signal from at least one facility line to the add bus 134. In response to the enabling signals from the control RAM 128, the add selector 124 connects one of the SONET buses to the add bus of the transmitting payload interface module.

Figure 8:
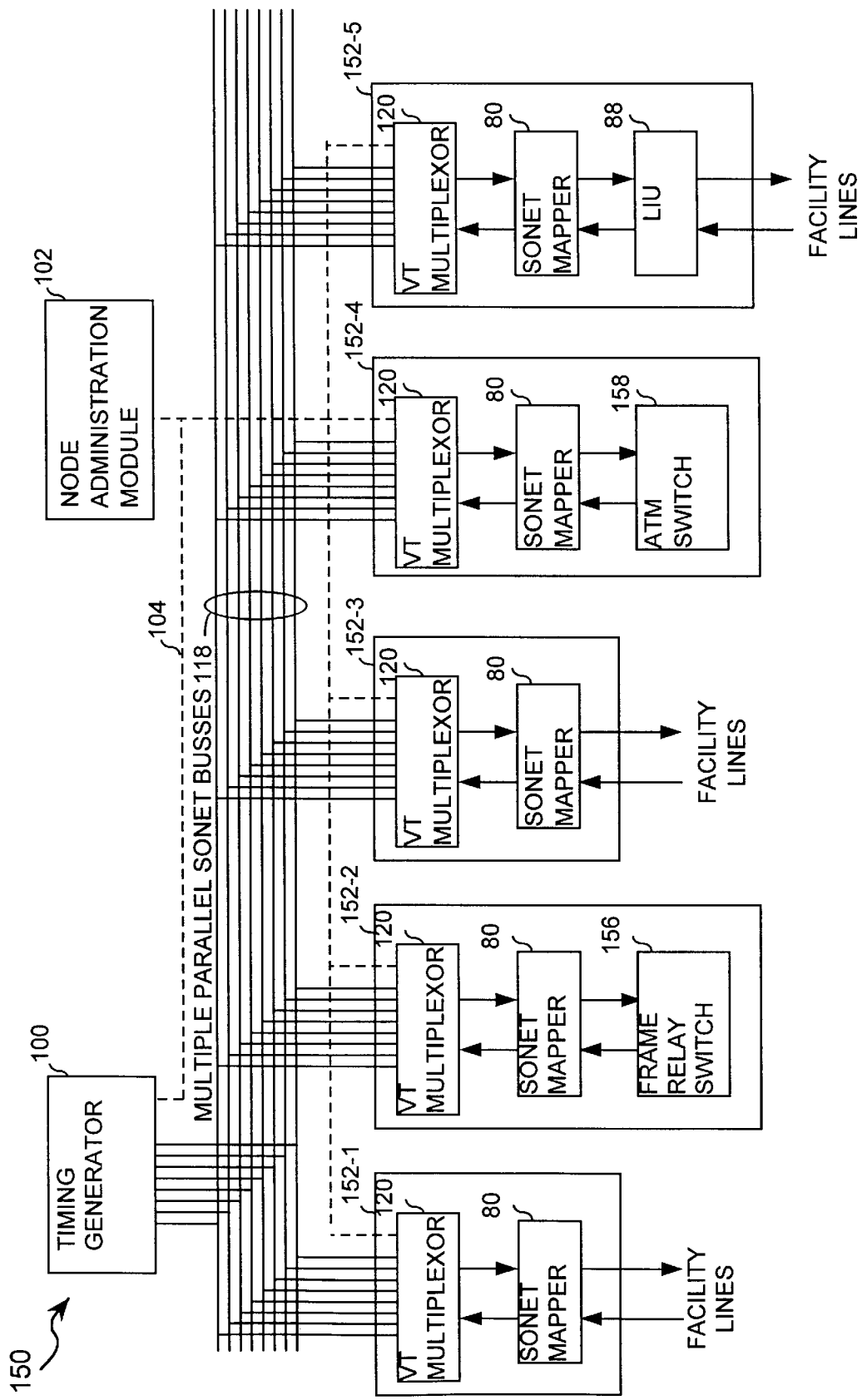
FIG. 8 is a block diagram of a communications system using the multiple parallel SONET bus architecture of the present invention.

In FIG. 8, an exemplary communications system 150 uses the multiple parallel SONET bus 70 architecture of the present invention in a backplane. The backplane has a set of connectors. The node administration module 102, the timing generator 100 and the payload modules 152 all plug into the connectors. The node administration module 102, timing generator 100, and connectors were described above.

Each payload module 152 includes a VT multiplexor 120, as described above, that connects to at least one SONET mapper 80. In some payload modules 152, the SONET mapper 80 connects to facility lines transporting DS1, DS3, E1, E3 or STS-1 signals, as described above. In one payload module 152-2, the SONET mapper 80 connects to a frame relay switch 156. The frame relay switch 156 may be implemented on the payload module 152. In another payload module 152-4, the SONET mapper 80 connects to an ATM switch 158. Telecommunications signals from different types of facilities, with different formats are interconnected. For example, the SONET signals can be used to exchange data between the frame relay switch 156 and the ATM switch 158. To connect to a new type of telecommunications interface, only an additional payload module need be designed.

Parallel interconnection provides high-speed systems using lower-speed electronics, thus reducing cost. The clock rate of a single SONET bus is one-eighth of the data rate of the system. For example, for a 155.52 Mbps data transfer rate, the SONET bus clock rate is 19.44 MHz. When multiple SONET buses (N) are connected using the present invention, the bus clock rate remains the same while the data rate increases by a factor of N. With this architecture, a data rate of 1.24415 GHz is achieved using eight parallel SONET STS-3 level buses.

Ring Architecture

Using the previous architectures, any two units on the SONET bus communicate information in a single timeslot and the total propagation time between any two units does not exceed the duration of the timeslot. Ideally, the SONET bus would not incur any propagation delay time. In practice, the set-up and hold time of the electronic devices causes propagation delay. Because of the propagation delay, at a seventy-seven MHz clock rate, the maximum distance between interface units is less than twelve inches, creating a severe limitation on the physical size of the backplane and therefore the system capacity. In addition, the previous architectures connect every payload interface module to all buses. As the number of buses increases, the number of I/O connections and associated logic grows, eventually reaching an uneconomic point. Therefore, there is a need for a cost-effective apparatus and method to expand the system capacity.

Figure 9:
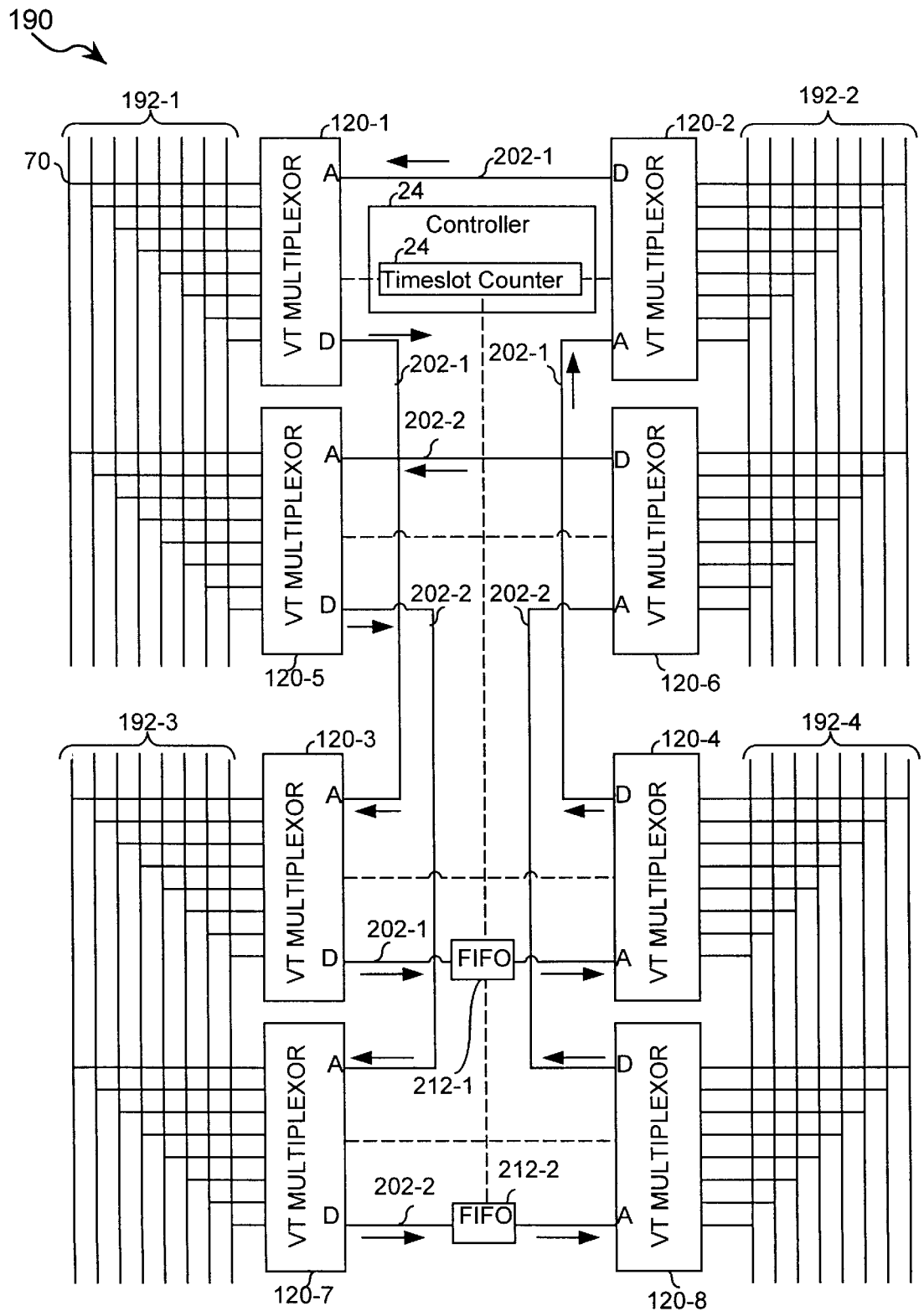
FIG. 9 is a block diagram of a ring architecture interconnecting multiple sets of the multiple parallel SONET buses of FIG. 7.

As shown in FIG. 9, to overcome the above limitations, in another SONET bus architecture 190, multiple sets 192 of multiple parallel SONET buses 70 are connected in a ring. Two rings 202-1, 202-2 interconnect four sets 192-1 to 192-4 of multiple parallel SONET buses. One of the rings is a primary ring 202-1, while the other ring 202-2 is a backup ring that is used when the primary ring fails. In one embodiment, a communications system has four shelves and each set 192 of multiple parallel SONET buses is implemented on one of the shelves.

A set of VT multiplexors 120 provide the ring interconnections. To form each ring 202, a drop bus output (D) from one VT multiplexor 120 is connected to an add bus input (A) of another VT multiplexor 120. For example, in ring 202-1, the drop bus (D) of VT multiplexor 120-2 is connected to the add bus input (A) of VT multiplexor 202-1. The timing of each set of buses 192 is derived from the add bus of the VT multiplexor 120 driving that set of buses, and this timing varies at each point on the ring because of timing delays on the interconnection. If the propagation delay between the add bus input and the drop bus output is M microseconds, and T0 represents the time that timeslot 0 occurs on the buses 192-3, then timeslot 0 will occur at time T0+M on buses 192-4, time T0+2M on buses 193-2, and T0+3M on buses 192-1. The timing is correct because there is no dependency that each set 192 of multiple parallel SONET buses has identical timing, only that the add bus driving the set and each SONET bus within that set have identical timing. A problem would occur in the absence of the FIFOs 212 between VT multiplexors 120-3 and 120-4, and 120-7 and 120-8. Without these FIFOs 212, the add bus input to VT multiplexor 120-3 would be functioning with timeslot 0 at T0+4M, while the set of buses 192-3 would be functioning at timeslot T0. The FIFOs 212 add a delay such that the delay at the drop bus on VT multiplexor 120-4 is an exact multiple of 125 microseconds (the period of the SONET frame), causing the timeslots to realign.

Figure 10:
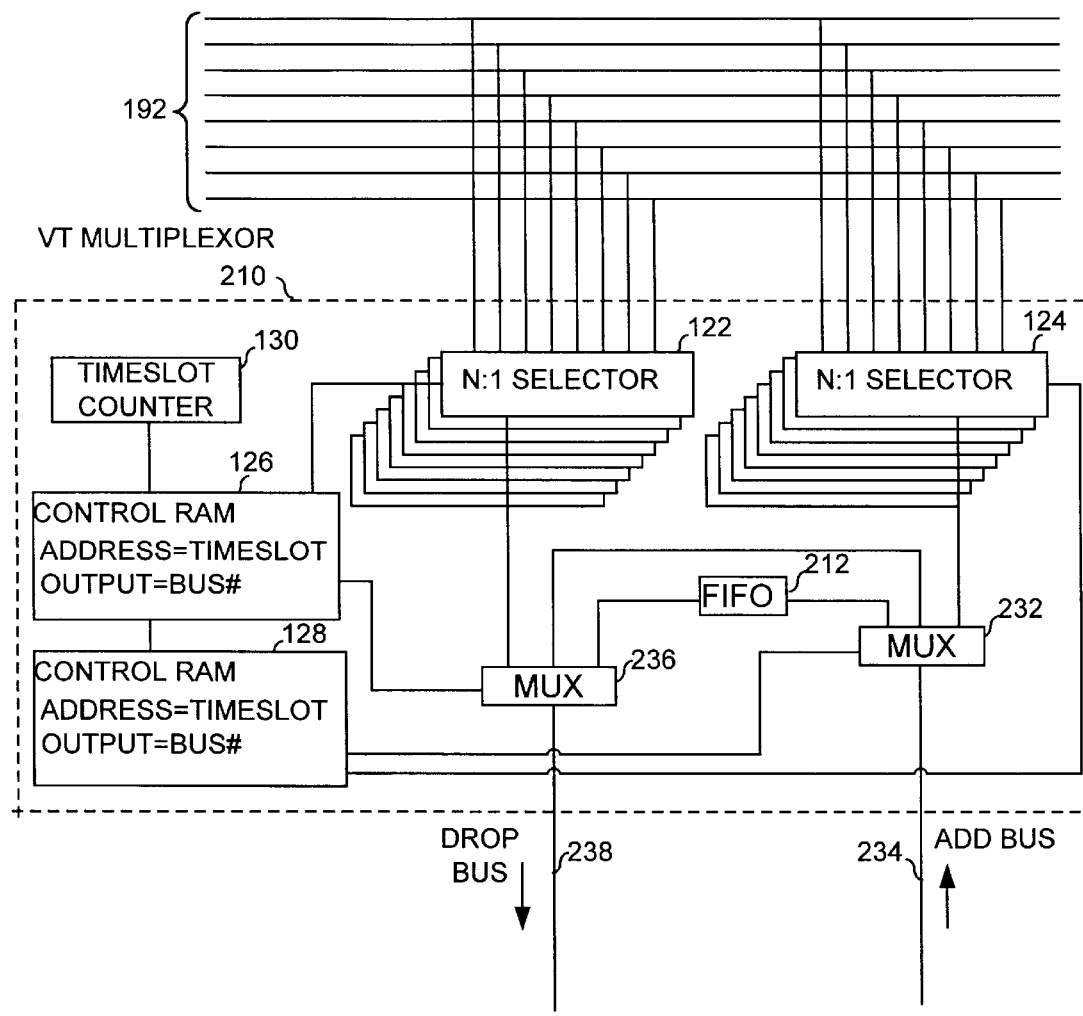
FIG. 10 is a block diagram of a ring interface multiplexor for use with the ring architecture of FIG. 9.

In FIG. 10, in an alternate embodiment, in the timing generator, the VT multiplexor 210 includes the ring closure FIFO 212. The VT multiplexor 210 of FIG. 10 is similar to the VT multiplexor 120 of FIG. 7, and therefore only the differences will be described. In the VT multiplexor 210, an input multiplexor 232 receives an incoming SONET signal from a ring add bus input 234. The input multiplexor 232 is responsive to signals output by the transmit selector control RAM 128, described above. An output multiplexor 236 is responsive to signals from the receive selector control RAM 126, and outputs a SONET signal on the drop bus output 238. The control RAMs 126, 128 are loaded with a pattern as described above.

In response to control values in the pattern output by the control RAM 128, the input multiplexor 232 can take three actions. The control values are different bits output by the control ram. First, in response to one control value the input multiplexor 232 supplies the signal on the ring add bus input 234 to the transmit selector 124 for transmission over one of the SONET buses.

Second, in response to another control value in the pattern output by the control RAM 128, when the signal on the add bus input 234 is destined for a SONET bus on a different set of multiple parallel SONET buses, that signal is passed through the input multiplexor 232 to the output multiplexor 236 and output via the ring drop bus 238 of the VT multiplexor 210.

Third, in response to yet another control value in the pattern output by the control RAM 128, the input multiplexor 232 supplies the SONET signal on the add bus input 234 to the ring closure FIFO 212. The ring closure FIFO 212 is enabled in only one VT multiplexor 210 on the ring 202. The control ram pattern 126 is such that, on the next timeslot, the signal in the ring closure FIFO 212 is output to the ring 202 via the output multiplexor 236. Preferably, the ring closure FIFO 212 is enabled in the VT multiplexor on the uppermost shelf of the ring 202.

Because the add bus 234 and drop bus 238 have a one-byte datapath, the datapath of the SONET ring is also one byte wide. One of the timing generators supplies timing signals for the SONET ring, using the timing signals described above.

Figure 11:
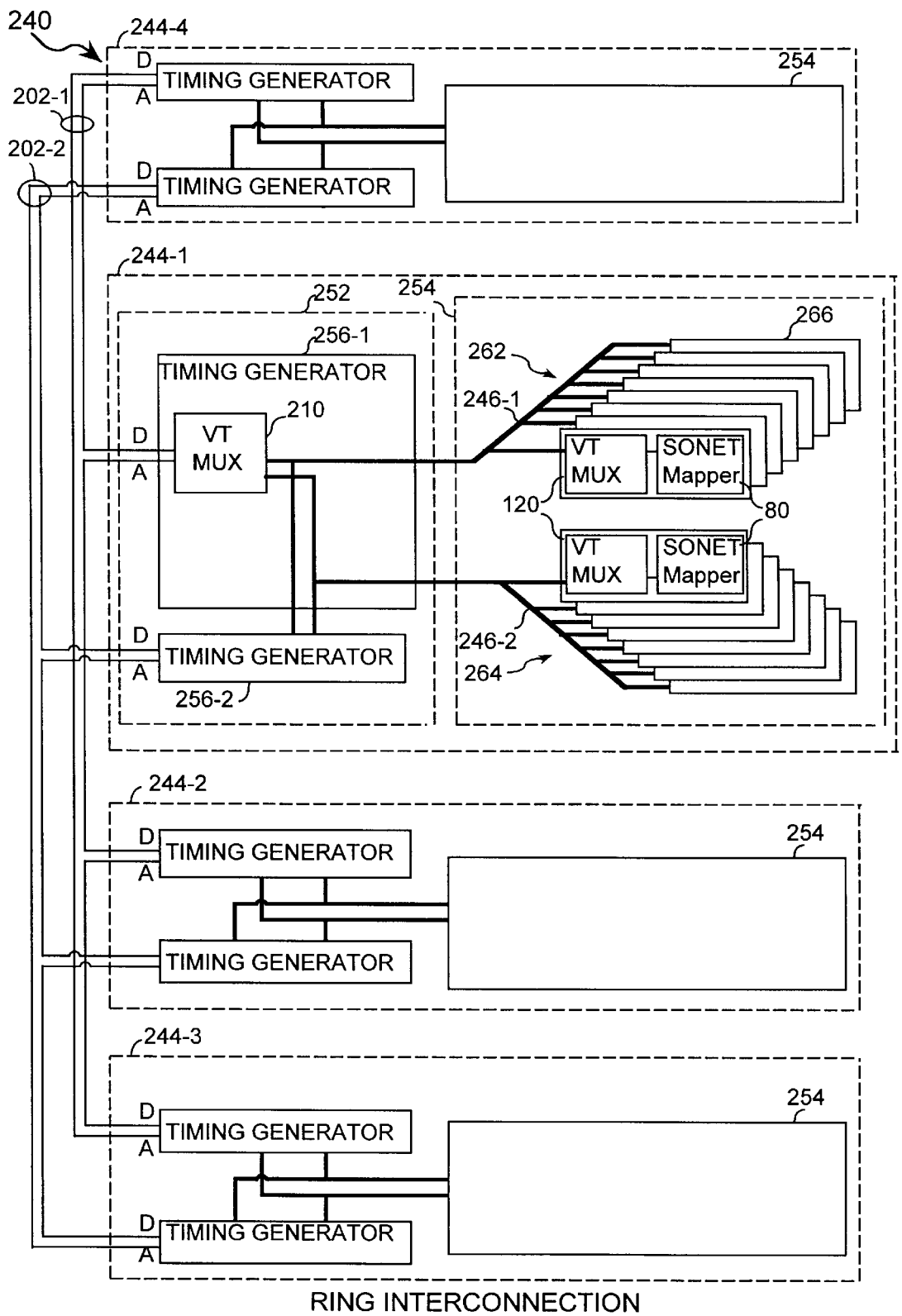
FIG. 11 is a block diagram of a communications system using a ring architecture to interconnect multiple shelves, in which each shelf uses the multiple parallel SONET bus architecture of FIG. 7.

In FIG. 11, in another embodiment, a ring architecture 240 using four shelves 244 is shown. Because each shelf 244 is the same, an exemplary shelf 244-1 is shown in detail and will be referred to and described as reference numeral 244. The shelf 244 has two independent sets 246-1, 246-2 of multiple parallel SONET buses.

The shelf 244 has a control portion 252 and an interface portion 254. In the control portion 252, a primary timing generator 256-1 and a backup timing generator 256-2 connect to the primary and backup SONET rings 202-1, 202-2, respectively. The timing generators 256 provide an interface between the SONET buses 246 of each shelf 244 and the SONET rings 202. Another backplane provides the interconnections of the SONET rings 202. Although each timing generator 256 uses a VT multiplexor 210 that includes a ring closure FIFO, only the ring closure FIFO of the timing generator in the uppermost shelf 244-4 is enabled. The control portion also includes the NAM that was described above.

In the interface portion 254, a first and a second set 262, 264 of payload modules 266 are connected to the first and second sets 246-1, 246-2 of multiple parallel SONET buses, respectively. Except for the coupling through the VT multiplexor 210, the sets 246-1, 246-2 of SONET buses are not physically interconnected, that is, the sets 246-1, 246-2 of SONET buses are physically independent. Each payload module 266 includes the VT multiplexor 120 and the SONET mapper 80, described above. Alternately, the payload modules 266 uses the VT multiplexor 210 that includes the ring closure FIFO, but does not enable the ring closure FIFO.

In one embodiment, the ring interconnections 202 are implemented with fiber. In an alternate embodiment, the ring interconnections 202 are implemented using a 12-pair cable.

ALTERNATE EMBODIMENT OF A PAYLOAD INTERFACE MODULE

Figure 12:
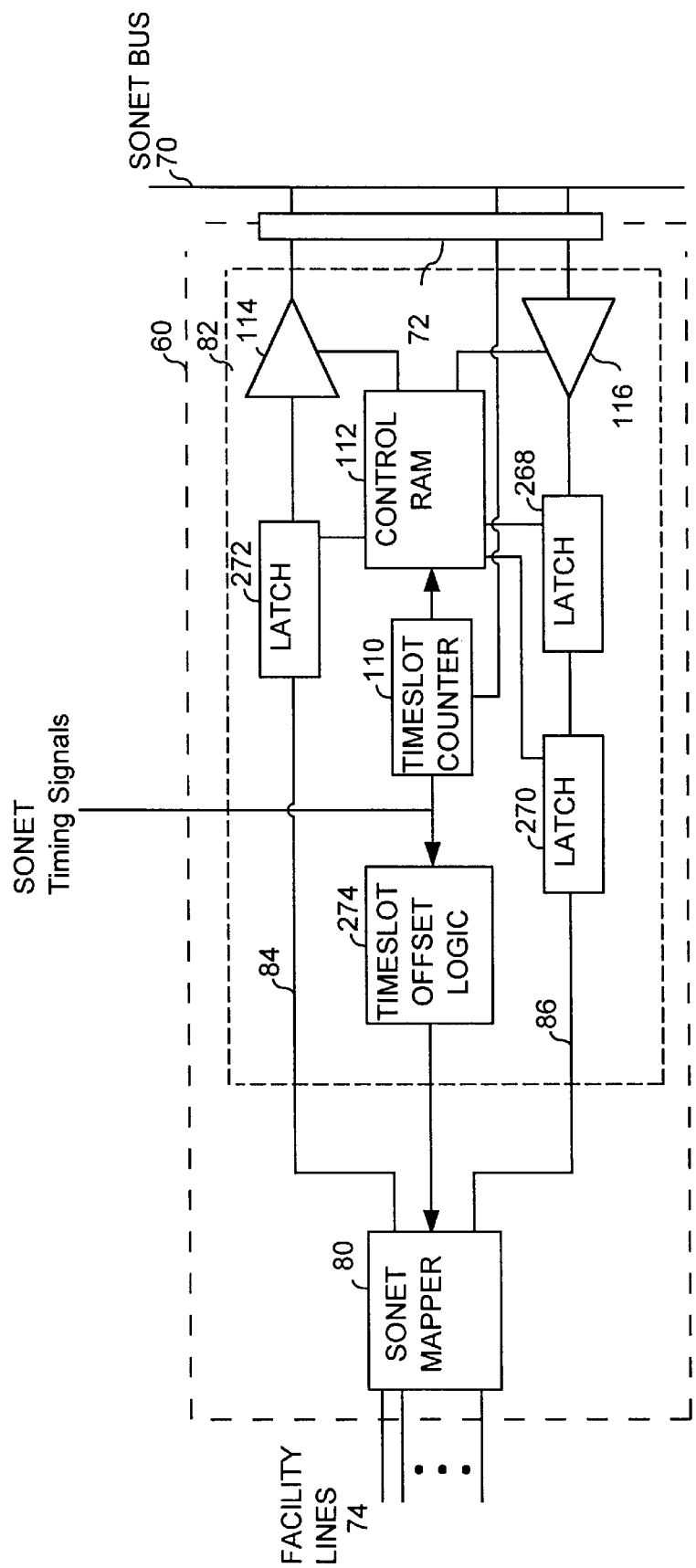
FIG. 12 is a block diagram of an alternate embodiment of the payload interface module of the SONET bus architecture of FIG. 4 that allows the SONET bus to operate at a different rate from the add and drop buses.

In FIG. 12, in an alternate embodiment, the payload interface module 60 allows the SONET bus 70 to operate at a different rate from the add and drop buses, 84, 86, respectively. In this embodiment, there are several forms of timeslots. The SONET bus 70 has SONET bus timeslots and operates at a higher speed than the add and drop buses. The add and drop buses, 84 and 86, have add and drop timeslots, respectively, and operate at a lower speed than the SONET bus 70. The period of the add and drop timeslots is greater than the period of the SONET bus timeslots.

To allow for the difference in timing, latch 268 receives and holds data from the SONET signal for a specified timeslot in response to a control value in the output of the control RAM 112. Latch 268 receives the data from the higher speed SONET bus 70 via bus driver 116. When the next available timeslot on the drop bus 86 occurs, the output of latch 268 is transferred to latch 270, thus driving the drop bus 86 for the SONET mapper 80 and freeing latch 268 to receive data during the next SONET bus timeslot.

The SONET mapper 80 outputs data on the add bus 84 during an add bus timeslot. During the period of the add bus timeslot, latch 272 will be outputting data from the previous add bus timeslot. This data will be output on the SONET bus when driver 114 is enabled. Simultaneously with disabling driver 114, latch 272 latches data from the add bus 84 to be output during another specified SONET bus timeslot. If no data is output during an add bus timeslot, the latch 272 will be loaded at the leading edge of the next add bus timeslot with data which will be output to the SONET bus 70.

For example, if the add and drop buses, 84 and 86, respectively, are operating at at one transmission rate, such as STS-N, and the SONET bus is operating at four times the transmission rate of the add and drop buses, such as STS-4N, then the add and drop busses would have timeslots four times as long as the SONET bus timeslots, but in phase alignment with the SONET bus timeslots. Using in-phase timing, timeslot 0 on the add and drop buses would correspond to timeslots 0,1,2 and 3 on the SONET bus. The circuit of FIG. 12 uses out-of-phase timing such that the timing of the add bus 84 is advanced relative to the timing of the SONET bus 70 and the timing of the drop bus 86 is delayed relative to the timing of the SONET bus 70. Using the example above, the timing on the add bus 84 is such that timeslot 2 of the add bus 84 and timeslot 0 of the drop bus 86 occur during SONET bus timeslots 4, 5, 6 and 7. Timeslot offset logic 274 modifies the timing signals to provide the out-of-phase timing to the SONET mapper 80 using the high speed SONET bus timeslot count signal from the timeslot counter 110.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A communication system comprising:
a bidirectional time-division multiplexed bus transporting SONET signals, wherein each of the SONET signals is transmitted by the bus during a respective assigned timeslot of a predefined set of timeslots;
at least one counter outputting a timeslot count signal for synchronizing the timeslots of the SONET signals;
a first SONET mapper coupled at one end to a first set of facility lines and coupled at a second end to the bus by a first interface; the first interface coupling the first SONET mapper to the bus for transmitting a first signal from the first set of facility lines to the bus during a first assigned timeslot and for receiving a second signal from the bus for transmission onto a first facility line of the first set of facility lines during a second assigned timeslot; and a second SONET mapper coupled at one end to a second set of facility lines and coupled at a second end to the bus by a second interface; the second interface coupling the second SONET mapper to the bus for receiving the first signal from the bus for transmission onto a first facility line of the second set of facility lines during the first assigned timeslot and for transmitting the second signal from the second set of facility lines to the bus during the second assigned timeslot;

wherein a bidirectional connection between the first and second sets of facilities lines is formed by the first and second interfaces and the first and second assigned timeslots of the bidirectional bus so that the first signal is conveyed from the first set of facility lines to the second set of facility lines without traversing a switching fabric and the second signal is conveyed from the second set of facility lines to the first set of facility lines without traversing a switching fabric.

2. The communication system of claim 1, further comprising:
a SONET transceiver coupling the bus to a network, the SONET transmitter for transmitting a third signal onto the bus during a third assigned timeslot and for receiving a fourth signal from the bus during a fourth assigned timeslot;
wherein
the first interface is configured to receive the third signal for transmission via the first SONET mapper onto a second facility line of the first set of facility lines.

3. The communication system of claim 1, further comprising:
a switch coupled to the first set of facility lines.

4. The switch of claim 3, wherein:
the switch utilizes an ATM protocol.

5. The switch of claim 3, wherein:
the switch utilizes a frame-relay protocol.

6. The communication system of claim 1, further comprising:
a first switch coupled to the first set of facility lines; and
a second switch coupled to the second set of facility lines.

7. The communication system of claim 6, wherein:
said first switch utilizes an ATM protocol; and
said second switch utilizes a frame-relay protocol.

8. The communication system of claim 1, further comprising:
where the bidirectional time-division multiplexed bus is a first bidirectional time-division multiplexed bus, a second bidirectional time-division multiplexed bus transporting SONET signals, wherein each of the SONET signals transported by the second bidirectional bus are transported by the second bidirectional bus during a respective assigned timeslot of the predefined set of timeslots.

9. The communication system of claim 1, wherein:
the bus utilizes a flexible common high speed interface, and the bidirectionality of said bidirectional SONET bus is accomplished without a switching fabric.

10. The communication system of claim 1, wherein:
the first interface transmits a third signal from a second facility line of the first set of facility lines onto the bus during a third assigned timeslot and receives the third signal from the bus for transmission onto a third facility line of the first set of facility lines.

11. A communication system comprising:
a bidirectional time-division multiplexed bus transporting SONET signals, wherein each of the SONET signals is transmitted by the bus during a respective assigned timeslot of a predefined set of timeslots;

at least one counter outputting a timeslot count signal for synchronizing the timeslots of the SONET signals;

a first SONET mapper coupled at one end to a first set of facility lines and coupled at a second end to the bus by a first interface; the first interface coupling the first SONET mapper to the bus for transmitting a first signal from the first set of facility lines to the bus during a first assigned timeslot and for receiving a second signal from the bus for transmission onto a facility line of the first set of facility lines during a second assigned timeslot; and a plurality of additional SONET mappers, each additional SONET mapper coupled at one end to a respective second set of facility lines and coupled at a second end to the bus by a respective second interface; the plurality of additional SONET mappers including a second SONET mapper coupled to a second set of facility lines and coupled by a second interface to the bus and a third SONET mapper coupled to a third set of facility lines and coupled by a third interface to the bus;

wherein the second interface couples the second SONET mapper to the bus for receiving the first signal from the bus for transmission onto a facility line of the second set of facility lines during the first assigned timeslot;

the third interface couples the third SONET mapper to the bus for transmitting the second signal from a facility line of the third set of facility lines onto the bus during the second assigned timeslot; and a connection between the first, second and third sets of facilities lines is formed by the first, second and third interfaces and the first and second assigned timeslots of the bidirectional bus so that the first signal is conveyed from the first set of facility lines to the second set of facility lines without traversing a switching fabric and the second signal is conveyed from the third set of facility lines to the first set of facility lines without traversing a switching fabric.

12. The communication system of claim 11, further comprising:

a SONET transceiver coupling the bus to a network, the SONET transmitter for transmitting a third signal onto the bus during a third assigned timeslot and for receiving a fourth signal from the bus during a fourth assigned timeslot;

wherein the first interface is configured to receive the third signal for transmission via the first SONET mapper onto a second facility line of the first set of facility lines.

13. The communication system of claim 11, further comprising:

a switch coupled to the first set of facility lines.

14. The switch of claim 13, wherein:

the switch utilizes an ATM protocol.

15. The switch of claim 13, wherein:

the switch utilizes a frame-relay protocol.

16. The communication system of claim 11, further comprising:

a first switch coupled to the first set of facility lines; and a second switch coupled to the second set of facility lines.

17. The communication system of claim 16, wherein:

said first switch utilizes an ATM protocol; and said second switch utilizes a frame-relay protocol.

18. The communication system of claim 11, further comprising:

where the bidirectional time-division multiplexed bus is a first bidirectional time-division multiplexed bus, a second bidirectional time-division multiplexed bus transporting SONET signals, wherein each of the SONET signals transported by the second bidirectional bus are transported by the second bidirectional bus during a respective assigned timeslot of the predefined set of timeslots.

19. The communication system of claim 11, wherein:

the bus utilizes a flexible common high speed interface, and the bidirectionality of said bidirectional SONET bus is accomplished without a switching fabric.

20. The communication system of claim 11, wherein:

the first interface transmits a third signal from a second facility line of the first set of facility lines onto the bus during a third assigned timeslot and receives the third signal from the bus for transmission onto a third facility line of the first set of facility lines.

21. The communication system of claim 1, wherein:

the first interface directly connects the first SONET mapper to the bus; and the second interface directly connects the second SONET mapper to the bus.

22. The communication system of claim 11, wherein:

the first interface directly connects the first SONET mapper to the bus; and each additional SONET mapper is directly connected at the second end to the bus by the respective second interface.

* * * * *